United States Patent Office 3,583,954
Patented June 8, 1971

3,583,954
CURABLE POLYTHIOL POLYMER/PLUMBATE COMPOSITIONS
Albert Franklin Vondy, Bordentown, N.J., assignor to Thiokol Chemical Corporation, Bristol, Pa.
No Drawing. Filed Oct. 25, 1968, Ser. No. 770,861
Int. Cl. C08g 23/00
U.S. Cl. 260—79                                    10 Claims

ABSTRACT OF THE DISCLOSURE

Stable mixtures of liquid polythiol polymers and metal orthoplumbates containing lead essentially only in the form of the orthoplumbate group, e.g. calcium orthoplumbate, cure rapidly when activated by water. The cured products are useful as coatings and sealants.

BACKGROUND OF THE INVENTION

This invention relates to a novel method of curing liquid polythiol, i.e. —SH and —SSH containing, polymers and to curable compositions thereof which are stable under conditions of room temperature and high temperature storage but which cure rapidly when activated by water.

Liquid polythiol polymers having various backbones, such as hydrocarbon, alkylene polysulfide, polyether, polythioether, and polyurethane, are known in the art. One of the commonest ways of curing polythiol polymers is by oxidizing the —SH or —SSH groups to form a disulfide —SS— linkage between polymer segments. Various organic and inorganic oxidizing agents may be used, one of the preferred being lead peroxide ($PbO_2$). This curing agent produces a rapid, tight cure at room temperature to form elastomers which have good cold flow and compression set properties. However, storage stable compositions cannot be made using lead peroxide. Also its dark brown color is objectionable for some applications. These disadvantages of lead peroxide have been overcome by the present invention while retaining the advantages of a lead cure. It was very unexpected and surprising to discover that a stable polythiol polymer composition containing a lead compound could be obtained, since $PbO_2$, $PbO$, $Pb_2O_3$ and lead tetraacetate are all known to form unstable compositions with polythiol polymers.

SUMMARY OF THE INVENTION

The present invention relates to storage-stable, water-activatable, curable compositions containing polythiol, i.e. —SH or —SSH group containing, polymers and a metal orthoplumbate, other than lead orthoplumbate, and to a method for curing these compositions by water activation. The preferred orthoplumbates are the alkaline earth metal orthoplumbates, particularly calcium orthoplumbate, which is used in an amount ranging from about 12 to about 50%, preferably about 20%, by weight of the polymer.

One object of the present invention is to provide a novel storage-stable curable liquid polythiol polymer composition which can be readily and easily cured by reaction with water.

Another object of the present invention is to provide several alternative methods of application for effecting the cure of the novel compositions described above. The cured compositions may be used for the same applications previously known for polythiol polymers e.g. sealants and coatings. Because of the use of water as the cure activator for the polythiol polymer/orthoplumbate compositions, and because of the relative rapidity of the cure, these compositions can be used for sealants or coatings under conditions where the presence of moisture or a slow cure would hinder the use of other cure systems, e.g. for sealing underwater leaks on ships and boats; for sealing underwater concrete structures as used in bridge construction etc.; for sealing or coating buildings or other outdoor structures during rainy weather; or for sealing damp building materials such as concrete blocks.

Another advantage offered by the compositions of the present invention is that the polymers, fillers, plasticizers and other additives used therein do not have to be specially dried before mixing with the metal orthoplumbate curing agent. Neither does a special dehydrating agent need to be added to the compositions. Using calcium orthoplumbate, it was found that compositions containing less than 0.6% moisture (based on the weight of the polymer) were stable for at least four months at room temperature and at least two months at 70° C.

Since cured polythiol/orthoplumbate compositions are usually light in color (e.g. yellow using calcium orthoplumbate), they may be used in certain colored formulations where dark brown $PbO_2$-cured compositions would be unsuitable. The color may be lightened further by the addition of light colored pigments such as titanium dioxide.

Because the orthoplumbate curing agent may be previously mixed in with the liquid polythiol polymer at the factory, e.g. on a paint mill, a more uniform dispersion can be obtained than if it were mixed in at the application site as is necessary with the $PbO_2$ curing agent. The water added to activate the cure need not be as carefully mixed in since it disperses throughout the composition.

Another advantage of the curable compositions of the present invention is that their work life may be controlled within certain limits depending upon the amount of water added while the total cure time remains unaffected.

DESCRIPTION OF THE PREFERRED EMBODIMENTS

Liquid polythiol polymers of various types are known in the prior art, of which the following are typical and may be used in the practice of the invention:

(A) Liquid polyalkylene polysulfide polymers having —SH terminals prepared as described in U.S. Pat. 2,466,963 and which have molecular weights of the order of 500 to 25,000 and which are viscous liquids having viscosities within the range of 300 to 100,000 centipoises at 25° C. Such liquid polymers can be cured by any of the various curing agents disclosed therein to form solid elastomers having excellent resistance to acids, alkalis, petroleum hydrocarbons and atmospheric oxidation. They have been found especially useful in providing rubbery films having good adhesion to metal surfaces. Thus the cured compositions have been used as sealants for sealing panes of glass to metal window frames and as lining materials for integral fuel tanks of aircraft. The commercially important liquid polymers of this type are particularly described in articles by Fettes and Jorzcak, published in "Industrial and Engineering Chemistry," vol. 42, page 2217 (1950), and vol. 43, page 324 (1951). They are generally prepared from bis-beta-chloroethyl formal and are essentially composed of recurring

groups and have free mercapto terminals through which they may be cured to form a solid elastomer. In the manufacture of these commercial polymers, a small percentage of trichloropropane is commonly mixed with the bis-beta-chloroethyl formal to provide a slightly crosslinked structure upon cure. Particularly commercially valuable polymers include those having preferably recurring groups, such as bis(ethyleneoxy)methane, bis-(butyleneoxy)methane, bis(ethylene)oxy, and bis(butylene)oxy and an average molecular weight of approximately 2,000 to 10,000 and preferably 3,500 to 8,000.

(B) Liquid —SSH terminated high rank polysulfide polymers prepared as described in U.S. Pat. 3,331,818 by reacting the conventional liquid polysulfide polymers of U.S. 2,466,963 as described above with elemental sulfur. The resulting products have a sulfur rank of about 1.6 to 5.0 and preferably about 2.5 to 3.5 and at least some sulfur linkages which contain more than two sulfur atoms. They may be cured upon exposure to the atmosphere or more rapidly by using the curing agents listed in said patent to form solid elastomers having greater solvent resistance than the conventional low rank cured polysulfide polymers described under (A). These polymers may also be in a blocked form wherein the —SSH terminals are blocked with aldehydes or ketones as described in Ser. No. 661,128 filed Aug. 16, 1967, now Pat. No. 3,422,077.

(C) Liquid —SH terminated polyethers such as —SH terminated polypropylene glycol as disclosed in U.S. Pat. 3,258,495.

(D) —SH terminated hydrocarbon polymers such as —SH terminated polybutadiene (Chem. & Eng. News, Apr. 4, 1966, page 37), —SH terminated butadiene/acrylontrile copolymers and the alkanepolythiol, aralkanepolythiol, and arenepolythiol polymers disclosed in U.S. Pats. 2,230,390; 2,436,137; and 3,243,411.

(E) Liquid —SH terminated polyurethanes such as disclosed in U.S. patent application Ser. No. 484,097 filed Aug. 1, 1965, now Pat. No. 3,446,780.

(F) Liquid —SH terminated poly(alkylene sulfide) polymers as disclosed in U.S. Pats. 3,056,841 and 3,070,580.

(G) Other polythiol polymers as disclosed in U.S. patent applications Ser. No. 484,105, now Pat. No. 3,413,265; Ser. No. 484,118 (now abandoned); and Ser. No. 484,122, now Pat. No. 3,446,775, all filed Aug. 31, 1965.

The preparation and properties of alkaline earth metal orthoplumbates, particularly barium, calcium, and strontium orthoplumbates, are described in various references including the following:

Paint Oil Colour J. 117, 716, 718, 720, 722 (1950)—C.A. 44, 4691d
J. Oil & Color Chemists' Assoc. 33, 295–311 (1950)—C.A. 45, 1356h
Compt. rend. 248, 10618 (1959)—C.A. 53, 18708b The calcium orthoplumbate, $Ca_2PbO_4$, used in the examples was the only commercially available orthoplumbate. It contained 94% $Ca_2PbO_4$, the remainder consisting essentially of calcium and lead oxides. Typical physical properties are as follows:

Density—5.7 gms./cc.
Color—Cream
Bulk density—12–14 g./in.$^3$
Particle size:
    Less than 10 microns—75%
    10 to 20 microns—13%
    Over 20 microns—12%

The product as received and as used in the examples had been treated by the manufacturer to render it resistant to atmospheric moisture during storage and thus prevent decomposition by reaction with water to form first hydrated orthoplumbate, then hydrated metaplumbate and calcium hydroxide. This treatment did not affect the activity of the plumbate as a curing agent in accordance with the present invention as determined by extracting the plumbate with ethanol, whereby it was found that the extracted and non-extracted material had the same activity as a curing agent and formed curable compositions with the same storage stability. The extract contained a very small amount of a fatty material.

The water activation may be accomplished in the following ways:

(1) By applying water to the surface of the curable composition;
(2) By physically admixing water into the curable composition;
(3) By exposing the curable compositions to an environment containing water in the vapor state providing sufficient water is drawn into the composition to activate it. Depending on the relative humidity and the hygroscopicity of the orthoplumbate used, this might require the presence of a hygroscopic material in the curable composition;
(4) By first mixing water into the polymer and then adding the orthoplumbate curing agent. Since it has been found that a certain amount of water is required to initiate the cure, less than this amount of water may be present in the stored curable compositions which may then be cured when desired by adding the remaining necessary amount of water by any of methods (1) to (3).

The minimum amount of water necessary to initiate a cure appears to be roughly equivalent to one-half mole of water per mole of orthoplumbate. Although theoretically, one mole of orthoplumbate should cure two moles of —SH groups, it has been found that from a practical standpoint, roughly at least two moles of orthoplumbate are preferred. However, it was found that as much as 200% by weight of the polymer of calcium orthoplumbate did not adversely affect the stability of the compositions in the absence of water. The excess orthoplumbate not required for curing would then be present as inert filler.

The polysulfide polymers used in the examples are identified below:

LP–2 polysulfide polymer

Average structure—

with 2% crosslinking
Viscosity at 80° F.—350–450 poises
Average molecular weight—4,000
Moisture content—0.1–0.2%

LP–3 polysulfide polymer

Average structure—

$HS(C_2H_4OCH_2OC_2H_4SS)_6C_2H_4OCH_2OC_2H_4SH$ with 2% crosslinking
Viscosity at 80° F.—700–1,200 centipoises
Average molecular weight—1,000
Moisture content—0.1 maximum LP–5 polysulfide polymer
Average structure—

$HS(C_2H_4OCH_2OC_2H_4SS)_{17}C_2H_4OCH_2OC_2H_4SH$ with 2% crosslinking
Viscosity at 80° F.—75–125 poises
Average molecular weight—2,900
Moisture content—0.1% maximum LP–12 polysulfide polymer Average structure—same as LP–2 polysulfide polymer
with 0.1% crosslinking
Viscosity at 80° F.—350–450 poises
Average molecular weight—4,000
Moisture content—0.1%

LP–31 polysulfide polymer

Average structure—

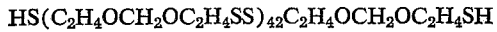

with 0.5% crosslinking
Viscosity at 80° F.—800–1,400 poises
Average molecular weight—7,500
Moisture content—0.2% maximum.

LP-32 polysulfide polymer

Similar to LP-2 polysulfide polymer with 0.5% crosslinking

P-541 polysulfide polymer

Similar to LP-2 polysulfide polymer with no crosslinking

P-350 polysulfide polymer

Average structure—

$HSS(C_2H_4OCH_2OC_2H_4—S_x)_{12}—C_2H_4OCH_2OC_2H_4SSH$ with 2% crosslinking and having the —SSH groups blocked with formaldehyde, where $x$ has an average value of 3.5.

EXAMPLES 1–6

Effect of variation in amount of water (—SH terminated polysulfide polymers)

As shown in the table below, the amount of water needed to activate the $Ca_2PbO_4$ cure of LP-2 polysulfide polymer was determined. Within certain limits, a variation in the set time but not in the cure time occurred with varying amounts of water. In each example 100 g. of LP-2 polysulfide polymer (containing 0.10% water) and 20 g. of $Ca_2PbO_4$ were mixed with the amounts of water indicated and allowed to cure at room temperature.

TABLE I

| Example Number | Amount of H²O, g. | Set time, minutes | Cure time |
|---|---|---|---|
| 1 | 0.50 | 60 | Approximately 4 hours. |
| 2 | 1.0 | 35 | Do. |
| 3 | 2.0 | 20 | Do. |
| 4 | 3.0 | 15 | Do. |
| 5 | 0.25 | | No cure after 3 weeks.[1] |
| 6 | 0.10 | | Do.[2] |

[1] Only viscosity increase.
[2] Little viscosity increase.

EXAMPLES 7–15

Cure of various polysulfide liquid polymers with $Ca_2PbO_4$

Calcium orthoplumbate was used to cure a variety of polysulfide liquid polymers which normally cure with $PbO_2$. Each mixture contained 10 grams of polymer, 2 grams of $Ca_2PbO_4$ and 3 drops of water. Each cured to a solid rubber in the times indicated in the table

TABLE II

| Example Number | Polymer | Cure time, minutes | Color of cured polymer |
|---|---|---|---|
| 7 | LP-5 | 30 | Light yellow. |
| 8 | LP-12 | 30 | Light brown. |
| 9 | LP-31 | 15 | Yellow-brown. |
| 10 | LP-32 | 15 | Deep yellow. |
| 11 | P-541 | 5 | Dark brown. |
| 12 | LP-2 [1] | 5 | Light yellow. |
| 13 | LP-2 [2] | 10 | Do. |
| 14 | P-350 | 20 | Dark brown. |
| 15 | LP-3 [3] | 30 | Deep yellow. |

[1] 5 drops H₂O used instead of 3 drops.
[2] 2 drops H₂O used instead of 3 drops.
[3] 100 grams LP-3, 40 grams Ca₂PbO₄, 3 grams H₂O.

EXAMPLE 16

Storage stability (Polysulfide polymer)

Two mixtures each containing 100 grams of LP-2 polysulfide polymer and 20 grams of calcium orthoplumbate were prepared and placed in screw cap jars. One jar was stored at room temperature and the other at 70° C. Both samples remained stable after approximately 35 days when the test was discontinued. Both samples then cured to a solid rubber upon the addition of water.

EXAMPLE 17

Effect of large amounts of $Ca_2PbO_4$ with polysulfide polymer

A mixture, having a gunnable sealant consistency, was prepared from 10 g. of LP-2 polysulfide polymer and 20 g. of $Ca_2PbO_4$. Two beads of this compound were laid down on cement blocks. One of the blocks was exposed outdoors and the other remained indoors at room temperature. After overnight exposure, the outdoor bead sample had attained a thick skin (the weather was very damp and the sample could have been rained on). The indoor bead sample remained unskinned showing that, in the absence of moisture, even a large amount of $Ca_2PbO_4$ did not cure the liquid polysulfide polymer.

EXAMPLES 18–22

Physical properties of cured polysulfide polymer, filled and unfilled

Two formulations as listed below were prepared on a paint mill and then mixed with water using a spatula. The samples cured in approximately 15 minutes to give solid rubbers which were stored at 80° F. for 24 hours and then pressed out into sheets for 10 minutes at 287° F. Physical properties were determined on these samples. These were compared to controls cured with $PbO_2$ and showed somewhat better physical properties.

TABLE III

| | Example Number | | | | |
|---|---|---|---|---|---|
| | 18 | 19 | 20 [1] | 21 [1] | 22 [1] |
| LP-2 polysulfide polymer | 200 | 200 | 100 | 100 | 100 |
| SRF Carbon Black | | 60 | | 30 | 30 |
| Ca₂PbO₄ | 40 | 40 | | | |
| Stearic acid | | | 1 | 1 | 1.4 |
| PbO₂ | | | 15 | 15 | 7.5 |
| Water | 6 | 6 | | | |
| Unaged physicals: | | | | | |
| 100% modulus, p.s.i | 95 | 190 | | | |
| 200% modulus, p.s.i | 138 | 300 | | | |
| 300% modulus, p.s.i | 180 | 425 | | | 475 |
| Tensile, p.s.i | 183 | 665 | 125 | 500 | 600 |
| Elongation, percent | 328 | 598 | 225 | 400 | 460 |
| Shore A Hardness | 43 | 58 | 37 | 47 | 54 |
| Heat aged (72 hrs. at 212° F.): | | | | | |
| 100% modulus, p.s.i | 65 | 200 | | | |
| 200% modulus, p.s.i | 97 | 363 | | | |
| 300% modulus, p.s.i | 128 | 530 | | | 625 |
| Tensile, p.s.i | 150 | 678 | | | 700 |
| Elongation, percent | 357 | 387 | | | 345 |
| Shore A Hardness | 31 | 49 | | | 57 |

[1] Control.

EXAMPLES 23–27

$Ca_2PbO_4$ cure of various polythiols

This series of experiments showed that $Ca_2PbO_4$ is effective as a water-activated curing agent for a variety of —SH terminated polymers having differnt polymer backbones.

The polymers are identified as follows:

| Polymer | Percent SH | Mol. wt. | Backbone |
|---|---|---|---|
| A | 1.38 | 4,780 | Polyether containing aromatic groups. |
| B | 2.3 | 2,000–3,000 | Polypropylene glycol. |
| C | 1.28 | 5,000 | 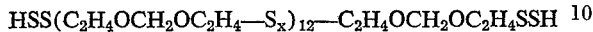[1] |
| D | 2.74 | 3,100 | Poly(propylene sulfide). |
| E | 2.2 | 3,000 | Butadiene/acrylonitrile 75/25.[2] |

[1] $n=20$–$25$, $m=2$–$3$, R=alkyl. Visc. 50 poises at 25° C.
[2] Visc. 35,000 cps. at 25° C.

In Table IV, 10 g. of each polymer was mixed with 2 g. of $Ca_2PbO_4$ and 3 drops of water and allowed to stand at room temperature.

TABLE IV

| Ex. No. | Polymer | Cure time | Remarks |
|---|---|---|---|
| 23 | A | 3 hours | Light yellow solid rubber. |
| 24 | B | (See remarks) | No cure in 24 hrs. Added 3 more drops H₂O; still no cure after another 24 hrs.; added 3 more drops H₂O; cured to solid overnight. |
| 25 | C | 5 minutes | Solid rubber. |
| 26 | D | {4 hrs. / Overnight | Partial cure. / Complete cure. |
| 27 | E [1] | Overnight | Soft cure. |

[1] 30 g. polymer, 6 g. Ca₂PbO₄, 9 drops H₂O.

I claim:
1. A water-activatable, storage stable, curable composition comprising a substantially anhydrous mixture of (a) a liquid polythiol polymer selected from the group consisting of
   (1) liquid polyalkylene polysulfide polymers having —SH terminals;
   (2) liquid high rank polyalkylene polysulfide polymers having —SSH terminals;
   (3) liquid high rank polyalkylene polysulfide polymers having —SSH terminals blocked with a carbonyl compound selected from the group consisting of aldehydes and ketones;
   (4) liquid polyethers having —SH terminals;
   (5) liquid hydrocarbon polymers having —SH terminals;
   (6) liquid polyurethane polymers having —SH terminals; and
   (7) liquid poly(alkylene sulfide) polymers having —SH terminals and
(b) an alkaline earth metal orthoplumbate, other than lead orthoplumbate, containing lead essentially only in the form of the orthoplumbate group.

2. A composition as in claim 1 wherein the orthoplumbate is calcium orthoplumbate.

3. A composition as in claim 2 wherein the calcium orthoplumbate is used in an amount ranging from about 12% to about 50% by weight of the polymer.

4. A composition as in claim 3 wherein the polythiol polymer is a liquid polyalkylene polysulfide polymer having —SH terminals.

5. A water-activatable, storage stable, curable composition comprising a substantially anhydrous mixture of (a) a liquid polythiol polymer and (b) an alkaline earth metal orthoplumbate, other than lead orthoplumbate, containing lead essentially only in the form of the orthoplumbate group.

6. A process for curing a liquid polythiol polymer having terminals selected from the group consisting of —SH and —SSH terminals which comprises reacting said polymer with an alkaline earth metal orthoplumbate, other than lead orthoplumbate, containing lead essentially only in the form of the orthoplumbate group, and water.

7. A process as in claim 6 which comprises the steps of (1) intimately mixing the polymer and the orthoplumbate and (2) intimately mixing water with the mixture produced in step (1).

8. A process as in claim 6 which comprises the steps of (1) intimately mixing the polymer and the orthoplumbate and (2) applying water to the surface of the mixture produced in step (1).

9. A process as in claim 6 wherein the orthoplumbate is calcium orthoplumbate.

10. A process as in claim 9 wherein the calcium orthoplumbate is used in an amount ranging from about 12% to about 50% by weight of the polymer.

References Cited

UNITED STATES PATENTS

| | | | |
|---|---|---|---|
| 3,046,248 | 7/1962 | Molnar | 260—31.8 |
| 3,225,017 | 12/1965 | Seegman et al. | 260—79.1 |
| 3,331,818 | 7/1967 | Bertozzi | 260—79.1 |
| 3,422,077 | 1/1969 | Bertozzi | 260—63 |
| 3,446,780 | 5/1969 | Bertozzi | 260—75 |

OTHER REFERENCES

Chemical Abstracts, vol. 63 (1965), column 9433h.

DONALD E. CZAJA, Primary Examiner

M. I. MARQUIS, Assistant Examiner

U.S. Cl. X.R.

117—124E, 135.1R; 260—18R, 312.2R, 37R, 77.5AP, 75NP, 79.1R